Sept. 25, 1934.   J. S. STEWART   1,974,520
ELEVATING AND EQUALIZING MECHANISM FOR WHEELED VEHICLES
Filed March 2, 1933   2 Sheets-Sheet 1
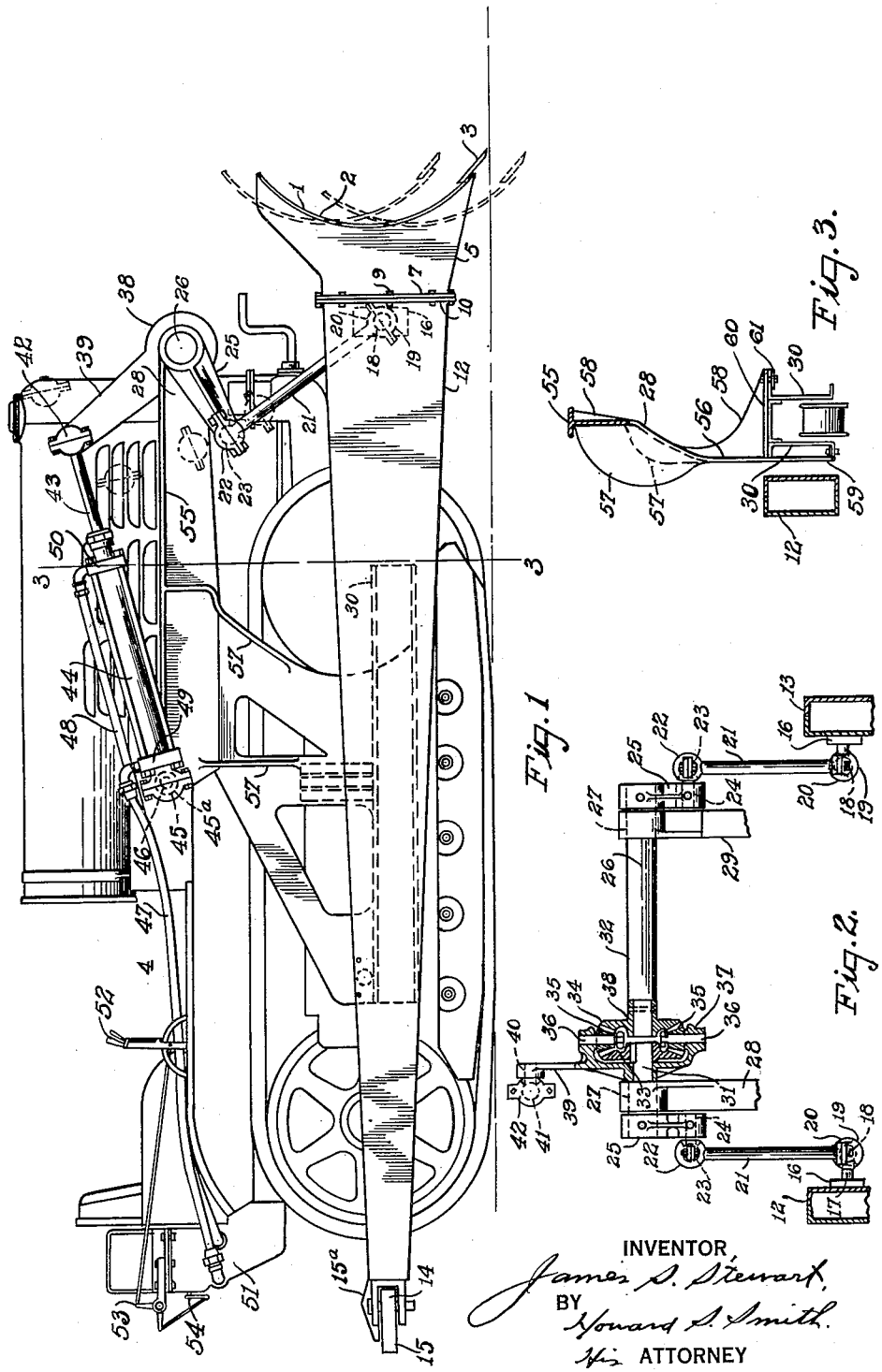
INVENTOR,
James S. Stewart,
BY Howard S. Smith.
His ATTORNEY Sept. 25, 1934.   J. S. STEWART   1,974,520
ELEVATING AND EQUALIZING MECHANISM FOR WHEELED VEHICLES
Filed March 2, 1933   2 Sheets-Sheet 2
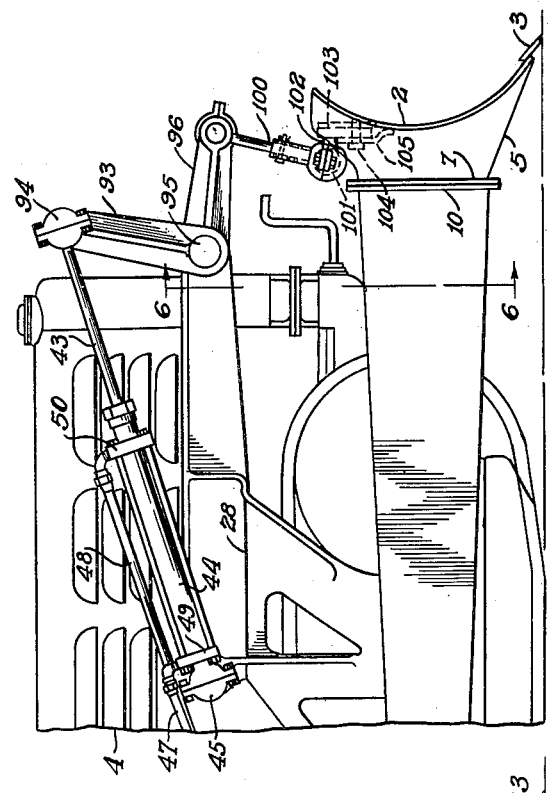
INVENTOR,
*James S. Stewart,*
BY *Howard S. Smith,*
*His* ATTORNEY Patented Sept. 25, 1934

1,974,520

UNITED STATES PATENT OFFICE 1,974,520

ELEVATING AND EQUALIZING MECHANISM FOR WHEELED VEHICLES

James S. Stewart, Sidney, Ohio, assignor to The Slusser-McLean Scraper Company, Sidney, Ohio, a corporation of Ohio Application March 2, 1933, Serial No. 659,359

7 Claims. (Cl. 37—144)

This invention relates to new and useful improvements in elevating and equalizing mechanism for wheeled vehicles, and more particularly to the provision of such a construction adapted for attachment to a tractor to move material such as earth or snow.

One of the principal objects of my invention is to provide a mechanism for maintaining the blade in a substantially level position despite a "banked" position of the tractor or prime mover.

It is another object of my invention to provide simple means for raising and lowering the bulldozer.

Another object of my invention is to provide attachment means for connecting a bulldozer or like device to a tractor or other prime mover without disturbing its tractive effort.

Other important and incidental objects of my invention will be more fully set forth in the following specification and subjoined claims; and while I have illustrated various preferred embodiments of my invention, it is to be understood that my construction is susceptible of modification within the scope of those claims.

In the accompanying drawings illustrating my invention, Figure 1 is a side view of my bulldozer elevating and equalizing mechanism attached to a conventional tractor and showing the invention in the preferred form. Figure 2 is a front view of the differential or equalizing mechanism employed with my device as shown at Figure 1. Figure 3 is a sectional view taken on the line 3—3 of Figure 1. Figure 4 is a partial side view of my bulldozer elevating and equalizing mechanism in modified form and attached to a conventional tractor. Figure 5 is also a partial side view of my bulldozer elevating and equalizing mechanism in another modified form, and likewise attached to a conventional tractor. And Figure 6 is a front view of the equalizing mechanism employed with the structure shown in Figure 5.

Referring now to the accompanying drawings for a complete description of my invention, the numeral 1 designates a conventional bulldozer formed with a concave plate 2 and having a lower reinforced beveled edge 3.

Secured to the rear face of the bulldozer 1, outside of the tread of a tractor 4 on which it is mounted, are rectangular bracket members 5, 5 one on each side of said tractor. These bracket members are formed of steel plates welded together and to the rear face of the bulldozer 1. On their rear faces these brackets 5, 5 are provided with vertical flanges 7, 7 by which they are secured by bolts 9 to companion flanges 10, 10 welded to the front ends of side frames 12 and 13 respectively. (See Figures 1 and 2.) These side frames are substantially hollow rectangular members formed of steel plates welded together. At their reduced rear ends these side frames are provided with clevis connections 14, by which they are attached to a cross bar 15 that in turn is connected at its center to the draw bar 15ª of the tractor 4 or other prime mover.

Secured to the inner face of each one of the side frames 12 and 13, immediately behind its flange 10, is a bracket plate 16 formed with a short bracket arm 17 terminating in an integral spherical end 18. (See Figures 1 and 2.) These spherical ends of the bracket arms are received by sockets formed within caps 19, 19 attached to the enlarged spherical ends 20, 20 of elevator bars 21, 21. (See Figures 1 and 2.)

The upper ends of the elevator bars 21, 21 are formed with socket portions 22, 22, to receive the spherical ends 23, 23 of stub shafts 24, 24. These shafts are secured in the outer free ends of elevating lever arms 25, 25, each of which is pinned to the projecting end of a front cross shaft 26. This shaft is journaled in bearings 27, 27 formed in the forwardly projecting ends of main brackets 28 and 29 attached to the sides of the tractor and supported on a longitudinal tractor frame 30, 30 for the caterpillar belts of the tractor. (See Figures 1, 2 and 3.)

Adjacent the side bracket 28, the shaft 27 is split to form a right section 31 and a left section 32. Keyed or otherwise attached to the adjacent ends of the shaft sections 31 and 32 respectively, are bevel gears 33 and 34, spaced apart and meshing with bevel pinions 35 positioned radially about their periphery. These beveled pinions are rotatably mounted on stub shafts 36 secured in a spider 37 likewise rotatable about the shaft 31 to form a conventional differential 38. Integral with the spider 37 and projecting radially therefrom is a lever arm 39. (See Figures 1 and 2.) Secured in the outer end of the arm 39 is a stub shaft 40 having a spherical end 41 freely mounted in a spherical recess formed between a cap 42 and the enlarged end of a piston rod 43. This piston rod may be either projected or retracted by a fluid cylinder 44 which receives it. The cylinder 44 is provided with a like ball and socket connection 45 with the spherical end 45ª of a stub shaft 46 mounted in the rear end of the side bracket 28.

Fluid is supplied to the cylinder 44 through conventional hose connections 47 and 48 to a rear cylinder head 49 and a front cylinder head 50 from a conventional fluid pump 51 mounted on the rear of the tractor and operated from the tractor power take off. By means of a control lever 52 near the operator and a linkage 53 connected with a control valve 54 in the fluid pump, fluid under pressure may be admitted to the cylinder 44, through the rear cylinder head 49, to raise the bulldozer the required amount, or through the front cylinder head 50 to force the bulldozer downwardly into the earth to increase the "bite" or scraping action.

When the tractor or other prime mover equipped with my improved elevating and equalizing mechanism passes over an uneven surface, such as when it is operating on sloping ground or on a hill side, the differential will permit the bulldozer to be maintained in a position level with the plane of the ground by the action of the differential. This is due to the fact that when one side of the tractor, and the bracket on that side drops with the declivity in the road surface, the corresponding elevator lever arm 25 on that side of the tractor through the action of the differential, will ascend and the opposite arm will descend a corresponding amount to compensate for, or eliminate, any tendency of the bulldozer to work at unequal depths. In other words, when one side of the bulldozer contacts the ground, the elevator bar 21 on that side will be forced upwardly to rotate its respective bevel gear 33, which in turn will rotate the bevel gear 34 in an opposite direction, thereby causing its respective arm 21 to descend to place the blade of the bulldozer in a position that is level with the plane of the road surface.

My side brackets 28 and 29, as shown in Figures 1 and 3, are substantially of plate construction, welded together and formed at the top with an inverted T section 55 supported by a curved web plate 56 from the longitudinal frame 30 of the tractor 4. This web plate is further stiffened and reinforced by ribs 57, 57 welded to its outer face, and inside ribs 58, 58 welded to its inner face adjacent the tractor proper. (See Figure 3.) At the lower ends, the web plate 56 terminates in an angle member 59 that is bolted to the bottom flange of the outer channel, forming the frame 30, and a flat top plate 60 projecting the width of the frame 30 and having secured thereto the bottom rib 58. This plate 60 is secured at its inner end to the top flange of the inner channel forming the frame 30 by bolted clips 61.

In Figure 4 I have shown a modified form of my invention, wherein I have substituted manually operated means for the hydraulic means shown in Figure 1. In this structure I have provided a compression spring counterbalance 62 for the bulldozer and side frames. This counterbalance consists of a spring tensioned rod 63 provided at its outer end with a socket portion 64 which is fitted to the spherical end 41 of the stub shaft 40 that is secured to the arm 39.

The rod 63 passes through a guide yoke 65, and has attached to its lower end a disc 66. The yoke 65 is provided with opposite flanges for connection with guide bars 67, 67 between which the disc 66 is received and reciprocates.

The lower ends of the bars 67, 67 are attached to the face of a bracket 68, which, with its companion cap 69, forms a ball and socket connection 70 with the spherical end 45ª of the stub shaft 46.

Positioned between the face of the bracket 68 and the disc 66, is a heavy compression spring 71 whose action, when compressed, tends to equalize the weight of the bulldozer and associated parts and renders its elevation by the manual means now to be described, less difficult. (See Figure 4.)

Mounted on an extension 72 of the stub shaft 40, and beyond the spherical portion 41, is a link 73 whose opposite end is also pivotedly mounted on a pin 74 secured in the outer free end of a lever 75. This lever 75, at its other end is secured to the outer end of a shaft 76 that extends through and is journaled in a suitable bearing formed in the side bracket 28.

Keyed or otherwise secured to the inner end of the shaft 76, and between the bracket 28 and the tractor 4, is a gear 77. (See Figure 4.)

Meshing with the gear 77 is a pinion 81 rotatably mounted on a stud 82 secured to the inner face of the bracket 28 behind the stud 76. Secured to the face of the pinion 81 is a ratchet wheel 83 that is engaged by a pawl 84 pivoted to a lever arm 85 that is also rotatably mounted on the stud 82. This pawl 84 has attached thereto a release link 86 whose upper end is attached to one side of an inverted Y shaped yoke 87. This yoke 87 is pivotally connected at its center to the upper end of the lever arm 85. The other side of the inverted Y is formed with a stop 88, adapted to engage the side of the arm 85 to arrest the rotation of the yoke 87.

Attached to the extreme upper end of the yoke is a link 89 terminating in a suitable handle 90 conveniently positioned within the operator's reach.

Positioned between the studs 82 and 76, and pivoted on the bracket 28, is a pawl 91 tensioned by a spring 91ª secured to a stud 91ᵇ which also engages the ratchet 83. The upper end of this pawl 91 terminates in an offset portion 92 positioned to be engaged by the lever arm 85 when it is forced forwardly by the operator to disengage the pawl 91 from the ratchet 83.

Now, when the arm 85 is oscillated by the operator, a rearward pull on the handle 90 will rotate the ratchet 83, and also the lever 75, in the direction indicated by the arrow at Figure 4. Through the link 73, arm 39, differential 38, lever arms 25, 25 and bars 21, 21, the lever 75 will raise the bulldozer, assisted by the compressed spring 71. When the handle 90 is forced forwardly, the yoke 87 will first disengage the pawl 84 from the ratchet 83, and when the stop 88 engages the arm 85, the latter will be moved forwardly until it strikes the offset 92 of the pawl 91 thus disengaging it from the ratchet 83. When this pawl 91 is thus disengaged, the bulldozer will drop to the ground.

It is thus seen that by this modified structure I have provided a simple mechanical means that is easily actuated and achieves substantially the same results as are obtained with the hydraulic means shown in Figure 1.

In Figures 5 and 6 I have shown still another modification of my invention for raising and leveling a bulldozer. In this structure I have utilized the hydraulic actuating means as shown at Figure 1 to rotate a lever 93 to whose upper end it is attached by a ball and socket connection 94 as previously described. The lower end of this lever 93 is keyed or otherwise secured to a through shaft 95 journaled in the forward ends of the main brackets 28 and 29. (See Figures 5 and 6.)

Secured to the shaft 95, one adjacent the inner face of each of the brackets 28 and 29, are two forwardly extending arms 96, 96. Projecting inwardly from the outer end of each one of these arms is a stub shaft 97 terminating in a spherical end that is received by a like recess formed between a cap 98 and the upper flanged end 99 of a bar 100, to form a ball and socket connection between the stub shaft 97 and a respective bar 100. (See Figures 5 and 6.) The lower ends of the bars 100, 100 are provided with like ball and socket connections 101, 101 with stub shafts 102, 102 attached to the outer ends of a yoke member 103 projecting transversely between the bars 100, 100.

At its center the yoke member 103 is pivotally secured by a clevis pin 104 to a bracket member 105 attached to the rear face of the plate 2 and formed with an aperture to receive the pin 104.

When a tractor or other prime mover equipped with this type of leveling means, encounters a declivity or unevenness in the road surface, causing one side of the tractor to drop, the cross shaft 95 and the yoke member 103 will assume an angular position similar to that indicated by the dotted lines in Figure 6, while, through the clevis pin connection, the bulldozer will remain in substantially a level position.

By retracting or projecting the piston rod from the cylinder as previously described for the construction shown at Figure 1, the bulldozer may be raised or lowered as desired.

It is thus seen that by the various types of elevating and leveling means which I have disclosed, a simple and efficient actuation of a bulldozer carried by a tractor or other prime mover, is possible without involving hazardous adjustments to the mechanism or delays in its operation.

Having described my invention, I claim:

1. A material moving device for attachment to a vehicle, a pair of side members pivotally secured behind their front ends to said vehicle, one of said side members on each side of said tractor, a blade secured to the front ends of said side members, and a differential mechanism between the vertical planes of the side members, and to which each side member is connected, to permit the maintenance of the blade in a substantially level position when one side of the vehicle is lower than the other side.

2. A material-moving device adapted for attachment to a tractor, a pair of side frames pivotally secured to the rear end of said tractor, one of said frames on each side of the tractor, a blade secured to the front ends of said frames, a split transverse shaft mounted on said tractor, a lever arm attached to each shaft section, elevator means connected between each lever arm and the side frame below it, and a differential mechanism to which the inner ends of said shaft sections are connected.

3. A material-moving device adapted for attachment to a tractor, a pair of side frames pivotally secured to the rear end of said tractor, one of said frames on each side of the tractor, a blade secured to the front ends of said frames, a split transverse shaft mounted on said tractor, a lever arm attached to each shaft section, an elevator bar connected between each lever arm and the front portion of the frame below it, a differential mechanism to which the inner ends of said shaft sections are connected, and means for turning the differential mechanism to raise the blade or force it into the ground.

4. A material-moving device adapted for attachment to a tractor, a pair of side frames pivotally secured to the rear end of said tractor, one of said frames on each side of the tractor, a blade secured to the front ends of said frames, a lever arm attached to each shaft section, an elevator bar connected between each lever arm and the front portion of the side frame below it, a differential mechanism to which the inner ends of said shaft sections are connected, a lever arm secured to said differential, a fluid cylinder, and a piston in said cylinder, pivotally connected at its outer end to the lever arm to raise the blade or force it into the ground.

5. A material-moving device adapted for attachment to a tractor, a pair of side frames pivotally secured to the rear end of said tractor, one of said frames on each side of the tractor, a blade attached to the front ends of said frames, a shaft mounted transversely on said tractor, a pair of lever arms secured to said shaft, an elevator bar connected between each lever arm and the frame below it, an arm for turning said shaft, and a counterbalance spring adapted to be compressed by the rearward movement of the last-named arm to equalize the weight of the frame and blade.

6. A material-moving device adapted for attachment to a tractor, a pair of side frames pivotally secured to the rear end of said tractor, one of said frames on each side of the tractor, a blade attached to the front ends of said frames, a shaft mounted transversely on the tractor, a pair of lever arms secured to said shaft, an elevator bar connected between each lever arm and the frame below it, an arm for turning said shaft, a rod pivotally secured at one end to said arm, an elongated guide, a helical spring in said guide, and a member longitudinally movable in said guide, for connection to said rod, to compress the spring and thereby equalize the weight of said frames and blade.

7. A material-moving device adapted for attachment to a tractor, a pair of side frames pivotally secured to the rear end of said tractor, and projecting forwardly, one on each side of the tractor, a blade attached to the front ends of said side frames, a shaft mounted transversely on the tractor, a pair of lever arms secured to said shaft, an elevator bar connected between each lever arm and the side frame below it, an arm carried by said shaft to turn it, a counterbalance spring structure connected to the last named arm to equalize the weight of the blade, an operating shaft mounted on said tractor behind the first shaft, a crank arm on said shaft, a link connected between said crank arm and the second arm, a gear on the second shaft, and handle and pinion means for rotating said gear to raise and lower the blade.

JAMES S. STEWART.